United States Patent
Bianchini

(10) Patent No.: US 7,048,531 B2
(45) Date of Patent: May 23, 2006

(54) MOLDING UNIT COMPRISING A COMPENSATION CHAMBER DELIMITED BY A MEMBRANE, MEMBRANE FOR SUCH A UNIT AND MACHINE EQUIPPED WITH SUCH A UNIT

(75) Inventor: Cedric Bianchini, Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 164 days.

(21) Appl. No.: 10/344,849

(22) PCT Filed: Jul. 24, 2001

(86) PCT No.: PCT/FR01/02407

§ 371 (c)(1),
(2), (4) Date: Jul. 24, 2003

(87) PCT Pub. No.: WO02/18115

PCT Pub. Date: Mar. 7, 2002

(65) Prior Publication Data

US 2004/0013762 A1    Jan. 22, 2004

(30) Foreign Application Priority Data

Aug. 31, 2000  (FR)  .................................. 00 11097

(51) Int. Cl.
    *B29C 49/48*  (2006.01)
(52) U.S. Cl. .................... 425/541; 425/405.1; 425/522
(58) Field of Classification Search ................ 425/522, 425/541, 405.1
    See application file for complete search history.

(56) References Cited

U.S. PATENT DOCUMENTS

| 3,829,264 A | * | 8/1974 | Mnilk et al. | 425/149 |
| 4,025,266 A | * | 5/1977 | Linde et al. | 425/578 |
| 5,411,391 A |   | 5/1995 | Albrecht et al. | |
| 5,968,560 A | * | 10/1999 | Briere et al. | 425/192 R |
| 6,444,160 B1 | * | 9/2002 | Bartoli | 264/545 |

FOREIGN PATENT DOCUMENTS

| DE | 19929033 A1 | * | 12/2000 |
| FR | 2 659 265 A |   | 9/1991 |
| WO | WO 98 13191 A1 |   | 4/1998 |
| WO | WO 00 53395 A1 |   | 9/2000 |
| WO | WO 01 00387 A1 |   | 1/2001 |

OTHER PUBLICATIONS

Webster's Ninth New Collegiate Dictionary, Merriam-Webster, 1990, p. 696, definition of "lip".*

* cited by examiner

*Primary Examiner*—Robert B. Davis
(74) *Attorney, Agent, or Firm*—Sughrue Mion, PLLC

(57) ABSTRACT

The invention concerns a molding unit comprising, between two components consisting of a mold element (22) and its support (18), a compensating chamber (56) wherein a pressurized fluid is injected to move apart the mold element (22) from its support (18). The invention is characterized in that the chamber (56) is delimited by a membrane (42) comprising a peripheral seal (44) with a lip, the membrane (42) being urged to press against one of the components (22, 18) and the seal lip (44) being urged to be tightly pressed against the other of the components (18, 22).

23 Claims, 3 Drawing Sheets

MOLDING UNIT COMPRISING A COMPENSATION CHAMBER DELIMITED BY A MEMBRANE, MEMBRANE FOR SUCH A UNIT AND MACHINE EQUIPPED WITH SUCH A UNIT

BACKGROUND OF THE INVENTION

The invention concerns the area of molding units that are under pressure, in particular for molding machines for blow molding articles of plastic materials.

Generally, molding units comprise two parts that are mobile, one with respect to the other, between a closing position of the mold and an opening position of the mold in which it is possible to extract the article that has just been molded. In addition, each of these parts of the molding units is sometimes made up of at least two entities, i.e. a support element and a molding element. The support element is connected in a definitive manner to the machine while the molding element is removable so that it can be replaced, at least in part, i.e. in the case of mold wear or in the case where the desire is to produce an article of a different shape.

The two parts are, in principle, locked to each other in closing position. In this closing position, it is necessary that the two parts of the mold be perfectly matched one against the other to ensure the proper form of the molded article.

Still, above all when the two mobile parts of the molding unit are locked to each other by a mechanical device, the manufacturing tolerances and the play necessary for functioning of the locking mechanism are such that, under the effect of the pressure necessary for molding, the two molds part slightly from each other.

Document FR-A-2,659,265 describes a molding unit in two parts, each part comprising a support element and a molding element. The two parts are movable with respect to each other due to the fact that the two support elements are hinged together. One of the molding elements is fixed rigidly on the associated support while the second element is mounted on its associated support in such a way that it can move, over a determined path, in a direction that is essentially perpendicular to the plane of the joint of the two elements of the mold. A sealing joint, which follows a closed curve, is captured between two faces opposite the mobile molding element and its support. A system of springs ensures that the joint remains locked no matter what the position is, relative to the molding element with respect to its support. In this way, along with the two faces opposite the molding element and its support, the joint delimits a closed chamber in which the plan is to be able to inject a fluid under pressure in such a way as to push the molding element away from its support. When the two supports of the mold are locked to each other, the tendency is thus to push the two halves of the mold against each other with great force without allowing them the possibility of spreading apart. This system has demonstrated its complete efficiency in its application with blow-molded units intended for blow molding machines for containers of polyethylene terephthalate.

SUMMARY OF THE INVENTION

An aspect of the invention is to improve prior blow molding units, in particular by increasing the efficiency by limiting the loss of compensation force due to the presence of spring systems that keep the sealing joint compressed.

With this aspect in mind, the invention proposes a molding unit comprising, between two entities made up by a portion of the mold and its support, a compensating chamber in which a fluid under pressure is injected to spread apart the portion of mold from its support, characterized in that the chamber is delimited by a membrane comprising a peripheral lip joint, the membrane coming into contact against one of the entities and the lip of the joint coming into sealed contact against the other one of the entities.

In an exemplary embodiment, the molding unit is made in two parts, each comprising one molding element held by a support and the pressure-compensating chamber is arranged between at least one of the element of the mold and the associated support to laterally push the molding element from one retracted position to an advanced position in the direction of the other element.

The two associated entities have active faces that are opposite each other and are arranged essentially in a cylindrical arch and between which the compensating chamber is intercalated in such a way that, under pressure, the lip is in contact against the first of the two active faces while the membrane is placed against the second active face.

The first active face has, around the lip contact perimeter, a raised edge, against which the joint is able to come into contact toward the outside under the effect of the excess pressure in the compensating chamber.

In accordance with further exemplary aspects of the invention, the joint is held in a groove that is arranged in the first active face. A source of fluid under pressure opens out into the face on which the joint lip is in contact, on the interior of the contact perimeter of the lip. The molding unit may also comprise several membranes arranged between the two same entities to create several compensating chambers corresponding to different zones of the mold.

In accordance with further exemplary aspects of the invention, the lip of the peripheral joint of the membrane is folded back toward the center of the membrane. In cross section, the peripheral joint exhibits a profile that is essentially in V or in U shape. The membrane is made of a flexible sealing material. The membrane and the peripheral joint are made in a single piece. The membrane comprises a support cloth on which the flexible sealing material is molded. The membrane has resistance to stretching, essentially isotropically in its plane. The reinforcement cloth has a weave such that its resistance to stretching is essentially identical no matter what the direction.

Finally, the invention involves a blow molding machine for articles of thermoplastic material, characterized in that it comprises at least one molding unit incorporating any one of the preceding characteristics.

BRIEF DESCRIPTION OF THE DRAWINGS

Other characteristics and advantages of the invention will be clear from reading the detailed description that follows and by viewing the attached drawings, in which.

DETAILED DESCRIPTION OF EXEMPLARY, NON-LIMITING EMBODIMENTS

Figure 1:
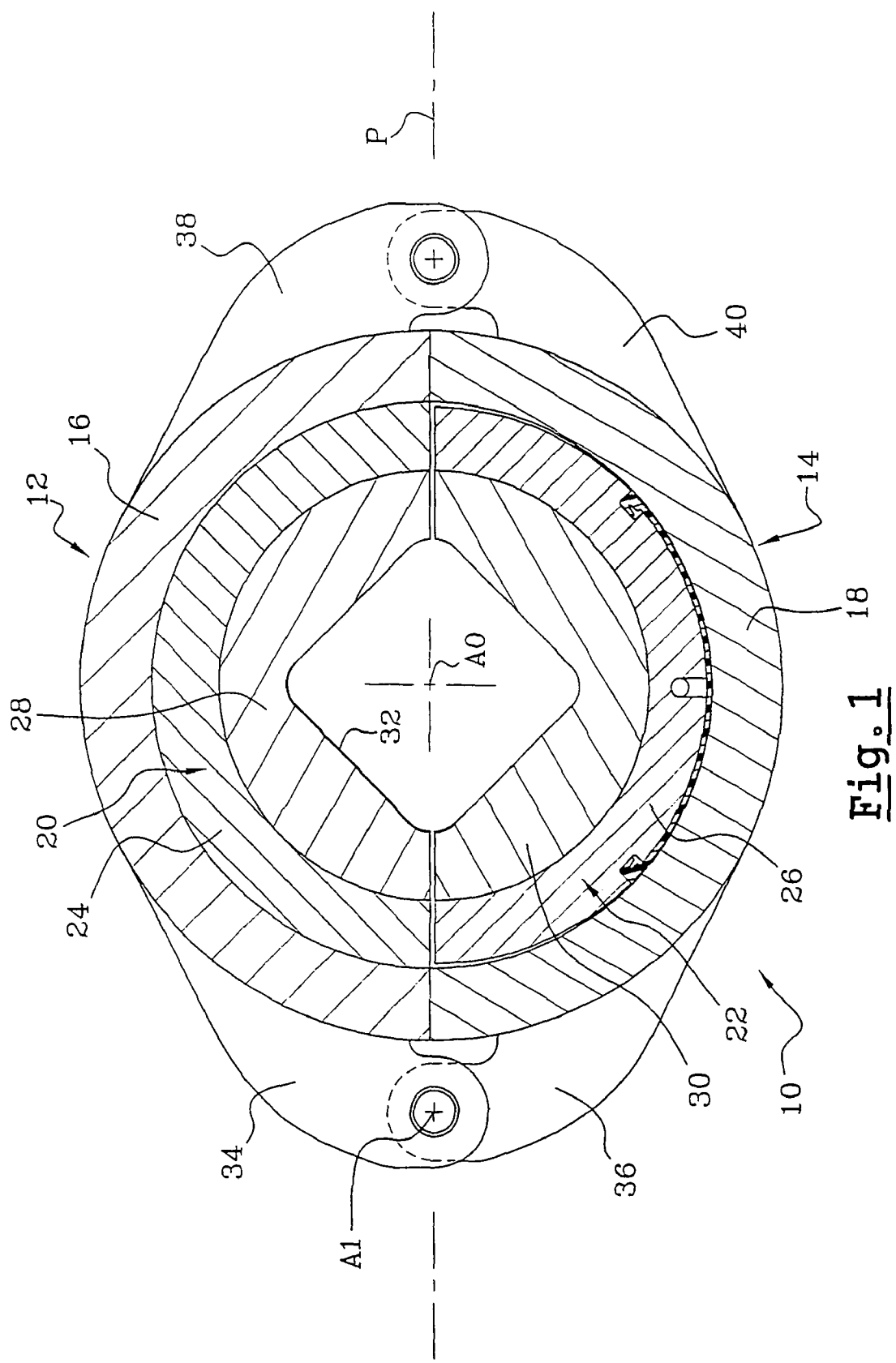
FIG. 1 is a schematic view in transverse cross section of a molding unit according to the teachings of the invention, the unit being shown at rest.
Figure 2:
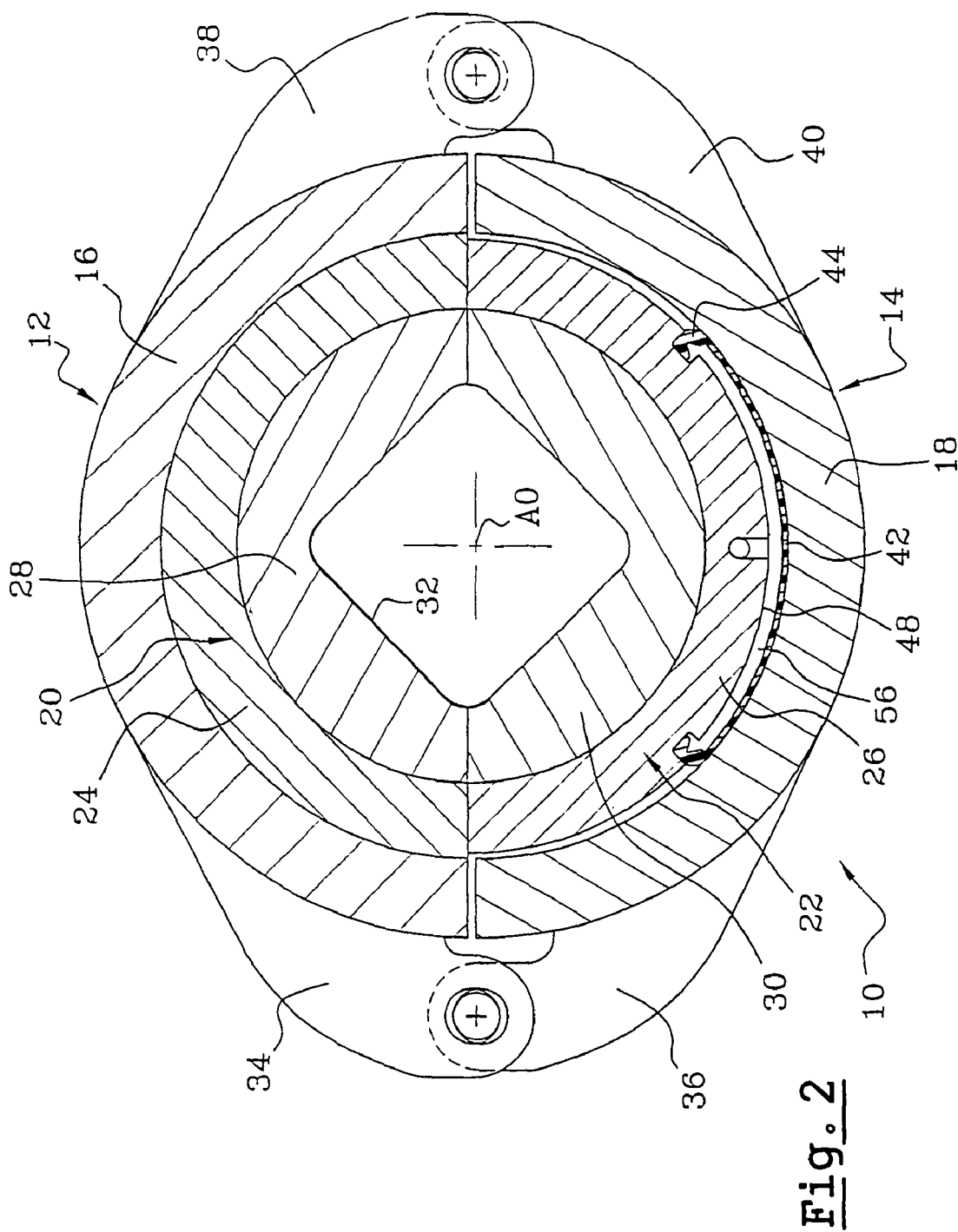
FIG. 2 is a schematic view in transverse cross section of the molding unit in FIG. 1, the unit being shown when the compensating means are in action.

FIG. 1 illustrates a molding unit 10 that is intended e.g. for a blow molding machine for containers of thermoplastic material. It could be, for example, an extrusion-blow molding machine or a drawing-molding machine for preforms of PET that were previously injection molded. In certain cases, the invention could also be used in molding units of injection molding machines.

The molding unit 10 is made up of two parts 12, 14 that are hinged with respect to each other around axis A1. Each part has a support element 16, 18 and a molding element 20, 22. In the example illustrated, the molding elements 20, 22 are each also produced in the form of two parts: a die holder 24, 26 that is connected to the associated support and a die 28, 30 that forms a unit with the die holder and in which a stamp 32 is formed which, once the mold closes, determines the shape of the object that will be molded. The stamp 32 here is, for example, one intended to form an object with axis A0, corresponding to the general axis of the molding unit 10, and with an essentially square cross section.

The construction of the molding elements in two parts, i.e. die and die holder, make it possible e.g. to arrange, on the inside of the die holder, a cooling fluid circulation line that can remain connected to the cooling circuit of the machine itself when it is time to change the dies that hold the stamp that determines the shape of the article. A device of this type is described in detail, for example, in the document FR-A-2,733,176. However, the invention could also be used with molding elements 20, 22 each constructed of a single piece.

In the example illustrated, the general shape of the supports 16, 18 of the die holder 24, 26 and the dies 28, 30 is essentially that of cylindrical semi-tubes encased one within the other around their common axis A0. The invention could also naturally be used in the case of molding units with a more prismatic shape such as those illustrated in the document FR-A-2,659,265.

The two parts 12, 14 of the molding units are essentially symmetrical to each other with respect to the plane of joint P, along which the two dies 28, 30 of the mold are in contact with each other. As can be seen in the figures, the plane of joint P contains axis A0, and axis A1 of articulation of the two parts 12, 14 is contained in the extension of plane P. In fact, the two supports 16, 18 each comprise articulating tabs 34, 36 which each extend in a plane that is transverse to axes A1 and A0 and which overlap in part to allow the passage of a connecting shaft (not shown) which extends along axis A1, preferably over the entire axial length of the molding unit.

In a similar way, but on the opposite side of the molding unit with respect with axis A0, supports 16, 18 each contain locking tabs 38, 40 which extend in such a way that it is possible that they can be crossed by the locking elements (not shown) that can move along an axis A2 parallel to axes A1 and A0. A locking system of this type is described, e.g. in the document FR-A-2,846,802.

In the example illustrated, one of the molding elements 20, which will be called fixed molding element, makes up a unit with the associated support 16 to which it is fastened without the possibility of movement. On the other hand, the other molding element 22, which will be called the mobile molding element, is fastened on its associated support 18 in such a way that it can glide radially in a direction that is essentially perpendicular to the plane of joint P. Fluid pressure compensating means are provided between the mobile molding element 22 and its support 18 which make it possible, when the mold unit is closed and locked, to push the mobile molding element in the direction of the fixed molding element in such a way as to place the two molding elements against each other along their joint plane.

According to the teachings of the invention, the compensating means comprise a flexible membrane 42 that is provided on its circumference with a lip joint 44.

Figure 3:
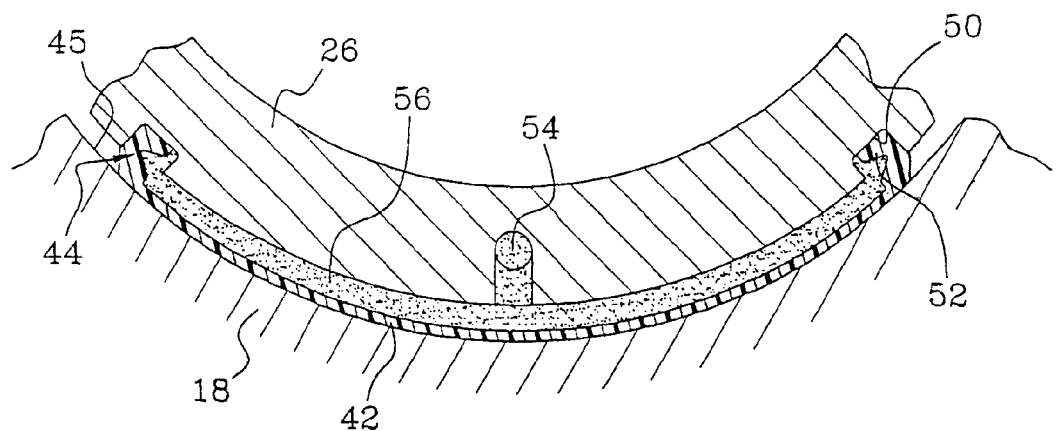
FIG. 3 is an enlarged view of a detail of FIG. 2 illustrating most particularly the compensating means and the seal integrity achieved by the lip of the joint of the membrane according to the invention.
Figure 4:
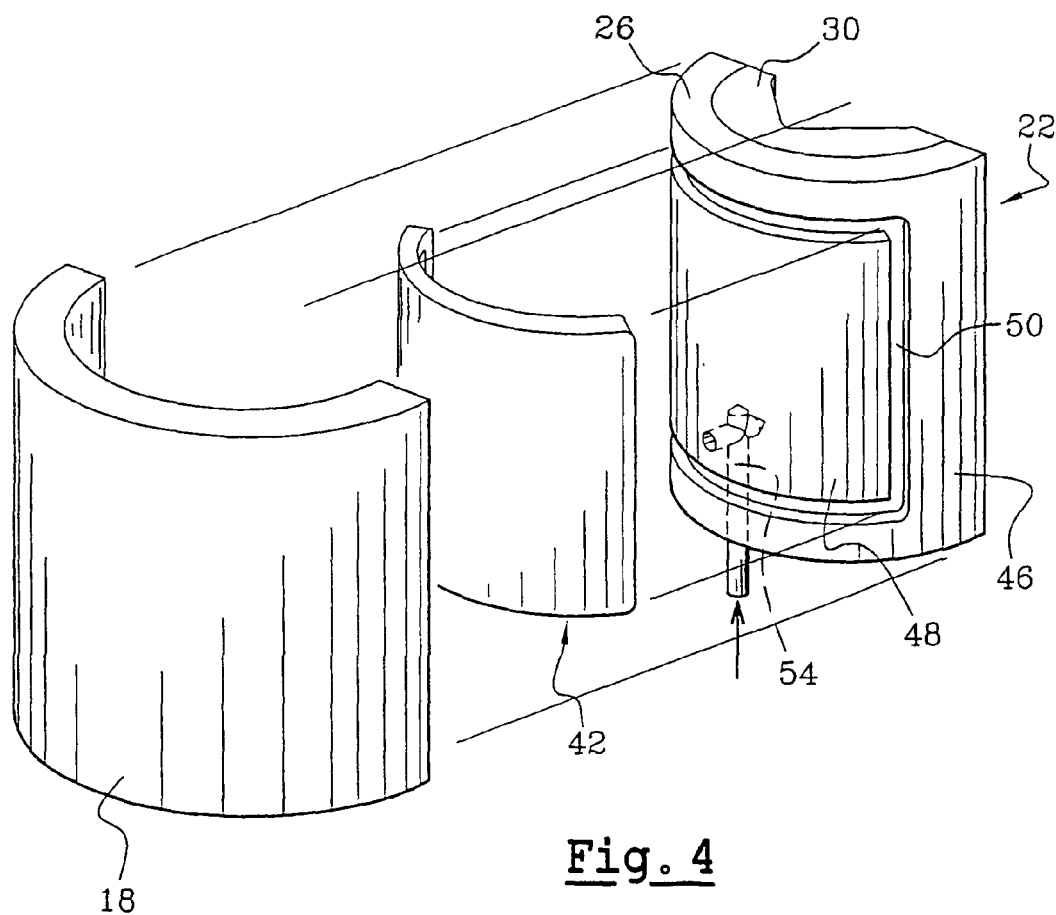
FIG. 4 is a schematic perspective exploded view of a part of the blow molding unit according to the invention.

The membrane 42 is arranged between the internal face in a concave cylindrical arch 45 of support 18 and the external face 46 in convex cylindrical arch of the mobile molding element 22 in such a way that once in place in the molding unit, the membrane also extends along a cylindrical arch. As can be seen in FIGS. 3 and 4, the external face 46 of the mobile molding element 22 has a recess 48 of which the depth corresponds essentially to the thickness of membrane 42 in order that the membrane does not interfere with the relative movement of the molding element and its support and it cannot become pinched between the two. Naturally the shape of the recess 48 corresponds to that of the membrane 42 which in the case of the figure shown, when flat, exhibits a rectangular shape with rounded corners.

Around recess 48, the external face 46 of the molding element 22 comprises a groove 50 that is provided to hold the joint 44 of membrane 42. Groove 50 thus follows a closed contour corresponding to that of joint 44 and corresponding to the shape of the membrane. The depth of the groove 50 is greater here than that of recess 48.

As can be seen in the cross sections, joint 44 exhibits a lip profile, the lip 52 being folded back toward the interior with respect to the membrane plane, i.e. folded back essentially toward the center of the membrane. In a schematic manner, in cross section, the joint thus presents a U or a V shape toward the center of the membrane. The lip 52 is provided to come into contact against the external face 46 of the molding element 22, more specifically against the base of the groove 50 arranged in this face 46. Lip 52 is deformable, the point of the V or U shape forming a sort of hinge.

In addition, the mobile molding element 22 has a duct 54, in this case hollow, in the die holder 26 which opens out into recess 48 of its external face 46 on the interior of the perimeter outlined by the groove 50, i.e. on the inside of the joint 44 contact surface with molding element 22. This duct 54 is provided to be connected to a source of fluid under pressure (not shown). In the case of a mold unit incorporated in a blow molding machine for articles of thermoplastic material, this source of fluid under pressure will advantageously be the same as that which is used to carry out the blow molding of the article, i.e. a source of air under pressure.

FIG. 1 illustrates the molding unit closed, but before the molding pressure is exercised on the interior of the cavity delimited by stamp 32 of the mold. Preferably, moving means (not shown) are provided so that, in the absence of pressure in the compensating chamber 56, the mobile molding element 22 would be pressed against its support 18. Still, the moving force will be relatively slight and will be calculated only to prevent the molding element 22 from moving around with respect to support 18 at the moment of opening and closing of the molding unit. Due to the recess 48 and the groove 50, neither membrane 42 nor joint 44 will be pinched between the mobile molding element 22 and its support 18. Possibly it could also be provided that the joint would be slightly pinched between the base of the groove 50 and the internal face 45 of support 18. Still, this pinching essentially translates into a slight deformation of lip 52 of joint 44 in such a way that the resulting force will be very slight. In a general manner, the compensating means do not obstruct the closing of the molding unit in a significant way.

Once the molding unit is closed, it is then possible to inject, through duct 54, fluid under pressure into chamber 56, which is delimited by joint 44, membrane 42 and by the surface of recess 48 of the external face 46 of molding element 22. Due to the effect of the excess pressure that exists in this chamber 56, joint 44 deforms in such a way that its lip 52 is placed against the base of the groove 50 while the part of the joint that is connected to membrane 42 flattens, just like membrane 42, against the internal face 45 of support 18. The lip joint 44 thus folds back to ensure perfect sealing of chamber 56 in spite of the fact that, under the effect of the pressure in chamber 56, molding element 22 moves slightly away from its support 18. The presence of groove 50 can, in particular, prevent the joint 44 from deforming too much radially under the effect of the pressure. In particular, this makes it possible to prevent the necessity of reinforcing it with an internal fitting.

Naturally, the locking mechanism for the supports and the possible deformation of the supports permits only a relatively slight spreading, the pressure in chamber 56 thus tends to press, with a very great force, the mobile molding element 22 against the fixed molding element 20 in such a way that there is no offset of the two molding elements at the level of their joint plane.

Preferably, membrane 42 and its lip joint 44 are made of a single piece by molding a flexible and sealing material such as silicone. Naturally, other polymer materials can be used, e.g. polyurethane.

The membrane can e.g. be reinforced by a textile cloth which is then coated with silicone. Advantageously, the cloth will be chosen in such a way as to exhibit a resistance to the traction forces that is essentially uniform in all directions, this is done in particular in order to avoid too great a deformation of the membrane at the level of its corners. An example of a cloth having such characteristics can be found in the documents U.S. Pat. No. 5,351,722 or EP-A-0,263,392.

In the example that has just been described, the membrane comes into contact against the support while the lip joint is pushed against the molding element. Naturally, by pure mechanical inversion, the membrane could be arranged in such a way that it comes in contact against the molding element while the lip of the joint comes in contact with the support. It would then be necessary to provide that the fluid feed duct under pressure would not open into the external face of the molding element but into the internal face of the support.

In the example illustrated, the mold unit comprises only a single compensating chamber. Preferably, this compensating chamber will be sized in such a way that the surface projected on the plane of the joint would be greater than that of the surface projected on the cavity delimited by the mold. In this way, even if the pressure used for molding the article and for compensation are identical, the locking force of the two elements of the mold which is created by the compensating chamber will be greater than the spreading force developed by the molding of the article.

Clearly, the invention could also be used with a membrane with a different shape than the one shown. In the case of a molding unit for bottles, the surface of the compensating chamber projected could be less at the level of the bottle groove in comparison to the surface with respect to the body of the bottle. Still, it is possible to arrange not just a single compensating chamber but several chambers, each created according to the principle of the invention, these chambers being distributed and possibly connected to different sources of fluid under pressure.

Still, there is nothing that would prevent the two parts of a molding unit from each being equipped with pressure-compensating means according to the teachings of the invention.

What is claimed is:

1. A molding unit comprising:
   a molding element;
   a support; and
   a compensating chamber between the molding element and the support in which a fluid under pressure is injected to move the molding element away from the support,
   wherein the chamber is delimited by a membrane having a peripheral joint with a lip, the membrane coming into contact against one of the molding element and the support, and the lip of the peripheral joint coming into sealed contact against the other of the molding element and the support, such that the peripheral joint is held by the molding element and the support.

2. The molding unit according to claim 1, wherein the molding unit comprises two molding elements respectively held by two supports, and wherein the pressure-compensating chamber is arranged between at least one of the molding elements and one of the supports associated with it to push the at least one of the molding elements in a transverse direction from a retracted position toward an advanced position in a direction of the other molding element.

3. The molding unit according to claim 1, wherein the molding element and the support comprise a first active face and a second active face across from each other which are arranged essentially in a cylindrical arch and between which the compensating chamber is intercalated in such a way that when under pressure, the lip is against the first active face while the membrane against the second active face.

4. The molding unit according to claim 3, wherein the first active face presents, around a contact perimeter of the lip, a raised shoulder against which the joint is able to come into contact toward an exterior under an effect of excess pressure in the compensating chamber.

5. The molding unit according to claim 4, wherein the joint is held in a groove arranged in the first active face.

6. The molding unit according to claim 3, wherein a source of fluid under pressure opens out into the first active face on which the lip of the joint is in contact, on an inside of a contact perimeter of the lip.

7. The molding unit according to claim 1, wherein the molding unit comprises several membranes arranged between the molding element and the support to create several pressure-compensating chambers corresponding to different zones of the molding unit.

8. The molding unit according to claim 1, wherein the lip of the peripheral joint of the membrane is folded back towards a center of the membrane.

9. The molding unit according to claim 8, wherein, in cross section, the peripheral joint presents a profile that is essentially one of a V and a U.

10. The molding unit according to claim 1, wherein the membrane is made of a flexible sealing material.

11. The molding unit according to claim 1, wherein the membrane and the peripheral joint are manufactured as a single piece.

12. The molding unit according to claim 10, wherein the membrane comprises a reinforcement cloth on which the flexible sealing material is molded.

13. The molding unit according to claim 1, wherein the membrane exhibits resistance to elongation essentially isotropically in its plane.

14. The molding unit according to claim 12, wherein the reinforcing cloth has a weave such that its resistance to elongation is essentially identical no matter what the direction.

15. A membrane for a molding unit comprising:
a lip joint provided on a peripheral edge of the membrane and configured to contact a first entity of the molding unit, and the membrane being configured to contact a second entity of the molding unit to delimit, between the first entity and the second entity, a pressure-compensating chamber,
wherein the peripheral edge of the membrane is operable to expand and contract to correspond with movement of one of the first entity and the second entity.

16. The membrane according to claim 15, wherein the lip joint is folded back towards a center of the membrane.

17. The membrane according to claim 16, wherein, in cross section, the peripheral joint presents a profile that is essentially one of a V and a U.

18. The membrane according to claim 15, wherein the membrane is made of a flexible sealing material.

19. The membrane according to claim 18, wherein the membrane and the lip joint are manufactured as a single piece.

20. The membrane according to claim 18, further comprising a reinforcement cloth on which the flexible sealing material is molded.

21. The membrane according to claim 15, wherein the membrane presents resistance to elongation essentially isotropically in its plane.

22. The membrane according to claim 20, wherein the reinforcement cloth has a weave such that its resistance to elongation is essentially identical no matter what the direction.

23. A blow molding machine for articles of thermoplastic material, comprising at least one molding unit, the molding unit comprising:
a molding element;
a support; and
a compensating chamber between the molding element and the support in which a fluid under pressure is injected to move the molding element away from the support,
wherein the chamber is delimited by a membrane having a peripheral joint with a lip, the membrane coming into contact against one of the molding element and the support, and the lip of the peripheral joint coming into sealed contact against the other of the molding element and the support, such that the peripheral joint is held by the molding element and the support.

* * * * *